US005774259A

United States Patent [19]

Saitoh et al.

[11] Patent Number: 5,774,259

[45] Date of Patent: Jun. 30, 1998

[54] PHOTORESTRICTIVE DEVICE CONTROLLER AND CONTROL METHOD THEREFOR

[75] Inventors: Susumu Saitoh; Michiko Nakanishi, both of Tokyo, Japan

[73] Assignee: Kabushiki Kaisha Topcon, Tokyo, Japan

[21] Appl. No.: 719,781

[22] Filed: Sep. 25, 1996

[30] Foreign Application Priority Data

Sep. 28, 1995 [JP] Japan .................................... 7-251430

[51] Int. Cl.[6] ........................................................ G02F 1/29

[52] U.S. Cl. .......................... 359/315; 359/323; 359/246; 359/279

[58] Field of Search .................................... 359/315, 323, 359/246, 279

[56] References Cited

U.S. PATENT DOCUMENTS 5,383,048 1/1995 Seaver ..................................... 359/279

5,585,961 12/1996 Saitoh et al. ............................ 356/345

*Primary Examiner*—Frank G. Font
*Assistant Examiner*—Reginald A. Ratliff
*Attorney, Agent, or Firm*—Haynes and Boone, L.L.P.

[57] ABSTRACT

A photostrictive device controller and a photostrictive device control method, which can produce a fast response without causing a sharp temperature rise when driving the photostrictive device. The photostrictive device controller comprises: a light source 2 for applying light to the photostrictive device 1 that, upon receiving light, produces a photostrictive effect; an illumination optics 3 for introducing light from the light source 2 onto the photostrictive device 1; and a control device 4 for controlling the energy density of light applied to the photostrictive device 1. The control device 4 of the controller controls the illumination optics device 3 to lower, at a point close to where the photostrictive effect of the photostrictive device 1 is saturated, the energy density of the irradiated light to a level at which the elongation caused by heat can be ignored.

11 Claims, 12 Drawing Sheets

ELONGATION OF PLZT WHEN IRRADIATED WITH LIGHT

TEMPERATURE OF LIGHT-IRRADIATED SURFACE (1) ED=50mw/cm²

SEPARATION OF FACTORS (PHOTOSTRICTIVE EFFECT, THERMAL INFLUENCE)

( 2 ) ED=120mw/cm²

SEPARATION OF FACTORS (PHOTOSTRICTIVE EFFECT, THERMAL INFLUENCE)

PHOTORESTRICTIVE DEVICE CONTROLLER AND CONTROL METHOD THEREFOR

BACKGROUND OF THE INVENTION

1. Field of the Invention

The present invention relates to a photostrictive device controller and a method of controlling the photostrictive device, and more particularly to a photostrictive device controller and a photostrictive device control method, which are suited for controlling the supply of energy to a photostrictive device, a ferroelectric ceramics that is driven by optical energy supplied.

2. Description of Related Art

A PLZT ceramics (hereinafter referred to simply as a PLZT) composed of (Pb, La) (Zr, Ti) $O_3$ is a ferroelectric ceramics that has a photostrictive effect whereby it extends upon absorbing light and which can transform optical energy directly to mechanical energy.

In recent years active research efforts have been made for the development of micromachines. Because it is difficult to use a lead wire to supply electric energy to an actuator that drives the micromachines, it is desired that the energy be supplied remotely to the micromachine actuator without physical contact.

There are growing expectations that the PLZT may be used as an actuator for micromachines because it can be controlled in its activation by irradiating light against the PLZT to supply energy to it without physical contact.

When the PLZT is used as a photostrictive piezoelectric device, however, its response to an input energy (the rate at which the device extends) is many orders of magnitude slower than when it is used as an ordinary piezoelectric device that is applied a voltage.

The response of the PLZT, a photostrictive device, depends on the amount of light energy supplied per unit area (energy density). The greater the density of light energy supplied, the better the response tends to be.

Besides being used for producing a minute elongation of the device by the photostrictive effect, the light energy absorbed by the photostrictive device is also converted into heat energy causing a temperature rise in the photostrictive device. This heat reduces the residual polarization of the photostrictive device causing it to contract. On the other hand, this heat expands the device by thermal expansion, making it difficult to control the amount of elongation. The temperature rise of the photostrictive device naturally increases as the density of light energy supplied increases.

When the photostrictive device is used as an actuator for the micromachine, the device needs to be reduced in size, which in turn reduces the heat capacity of the device itself. The reduced heat capacity subjects the device to greater influences of heat change caused by light application.

Hence, when the photostrictive device is used as an actuator material, it needs to have a fast response and it is preferred that the temperature change of the device be small (ideally zero). To improve the response, however, the amount of energy supplied must be increased as practicably as possible, whereas to suppress the generation of heat requires the amount of light energy supplied to be kept as small as possible. It is difficult to meet these conflicting requirements.

SUMMARY OF THE INVENTION

It is therefore an object of this invention to provide a photostrictive device controller and a photostrictive device control method, which can produce a fast response without causing a sharp temperature rise when driving the photostrictive device.

That is, the inventors of this invention have found as a result of experiments that changing the amount of optical energy supplied per unit time to the photostrictive device is effective in solving the above problem and producing a fast response without causing a sharp temperature rise in the photostrictive device.

This fact was able to be verified by the following experiments. Now, these experiments will be detailed.

EXAMPLE

FIG. 5 shows a sample photostrictive device or PLZT 15, which is a ferroelectric of perovskite type structure composed of Pb:La:Zr:Ti=97:3:52:48 in mol ratio.

The specimen 15, as shown in FIG. 6, is cut to a length of t=14.5 mm, a width of w=6 mm and to a thickness of d=3.3 mm, with a surface txd (14.5 mm×6 mm) used as the light receiving surface. The top and bottom surfaces wxd (6 mm×3.3 mm) are coated with Ag by roasting to form electrodes 21. Immersed in silicon oil, the sample is applied an electric field of 10 kV/cm in the direction of t (14.5 mm) (indicated by arrow P) for 40 minutes to perform polarization processing.

Heating Test

The specimen 15 was heated directly by an electric furnace and the thermal expansion of the specimen 15 in the direction of polarization (direction of t=14.5 mm) was measured. How the specimen 15 expanded is shown in FIG. 7 and the thermal coefficient determined from this measurement is shown in Table 1. FIG. 7(1) represents the elongation when the temperature is raised and FIG. 7(2) represents the elongation when the temperature is lowered.

TABLE 1

| Temperature range | | Expansion coefficient ($10^6$) |
|---|---|---|
| When temperature is raised | 20 ¯ 0 | 10.36 |
| | 0 ¯ 60 | 3.57 |
| When temperature is lowered | 26 ¯ 60 | 4.62 |
| | 0 ¯ 60 | 4.62 |

Light Irradiation Test

This experiment, as shown in FIG. 5(1), used a mercury lamp of 500 W as a light source 11, whose light was passed through an infrared cut filter 12 and two band-pass filters 13, 14 and formed into a collimated beam with a center wavelength of 365 nm and a band width of 6 nm. The collimated beams was then irradiated perpendicularly against the specimen 15 of a light straining piezoelectric device or PLZT. The beam is supposed to be irradiated uniformly over the entire light receiving surface of the photostrictive device.

The selection of the center wavelength of 365 nm is based on the report that the light straining effect becomes most conspicuous at this wavelength (by K. Uchino et al., Photostrictive effect in (Pb, La) (Zr, Ti) $O_3$, Ferroelectristics, 64, pp. 199–208 (1985)).

The amount of elongation of the specimen 15 was measured with an electric micrometer 16 and displayed on a data display device 17 such as an x-y plotter and a personal computer. The electric micrometer 16 and the specimen 15 were electrically isolated by an insulator 19, as shown in FIG. 5(2).

The temperature of the specimen 15 was measured by an infrared non-contact thermometer (irradiation thermometer) 18. The measurements were made under two conditions—light energy density of 50 mW/cm$^2$ and 120 mW/cm$^2$.

FIG. 8 shows a change with time in the elongation of the specimen 15 under respective energy densities. FIG. 9 shows the temperature of the specimen 15, indicating that the greater the energy density, the larger the elongation and the temperature change and the faster the response.

Based on FIG. 9 and Table 1, the elongation of the specimen 15 caused by heat was determined. The elongation produced when light is applied to the specimen is separated into a component caused by heat and a component caused by the photostrictive effect in FIG. 10 and 11.

The result shows that the specimen 15 made of a PLZT has the following properties.

(1) The maximum elongation caused by the photostrictive effect is almost constant regardless of the light energy density. When the light energy density is below a certain value, the smaller the light energy density, the smaller the maximum elongation will be (see FIG. 12).

(2) The elongation caused by heat increases as the energy density increases.

(3) Immediately after light is irradiated, the specimen extends by the photostrictive effect and its elongation is saturated. With elapse of time, elongation caused by heat becomes dominant.

That is, the elongation that occurs upon irradiation of light on PLZT is dominated initially by the elongation produced by the photostrictive effect and then by the elongation caused by the influence of heat.

(4) Irradiating light of high energy density against the PLZT generates a large optically induced current. The greater the optically induced current, the faster the potential difference between the electrodes is saturated and the better the response will become (see FIG. 13).

(5) A sharp temperature difference produces a large induced current whose magnitude is proportional to a temperature change. The induced current combined with the optically induced current saturates potential difference between the electrodes faster than when it is saturated only by the optically induced current. Irradiating light of high energy density therefore has an effect of enhancing the response of the PLZT.

The above results show that it is possible to enhance the response and suppress the generation of heat by irradiating, during the initial stage of light application, light of such a high energy density as will increase the response and then, after the elongation caused by the photostrictive effect reaches saturation, irradiating light of such a low energy density as will keep the amount of elongation constant and suppress a temperature rise.

Based on the above findings, the present invention adopts the following means to solve the problems mentioned above.

A first means of the present invention is a photostrictive device controller which comprises: a light source 2 for applying light to the photostrictive device 1 that, upon receiving light, produces a photostrictive effect; an illumination optics means 3 for introducing light from the light source 2 to the photostrictive device 1; and a control means 4 for controlling the energy density of light introduced to the photostrictive device 1.

A second means of the present invention is a photostrictive device controller in which the control means 4 of the first means is controlled in such a way as to irradiate light of a predetermined energy density against the photostrictive device 1 for a predetermined length of time and, after the predetermined length of time, lower the energy of light used for irradiation.

A third means of the present invention is a photostrictive device controller in which the control means 4 of the first and second means, at a point close to where the photostrictive effect of the photostrictive device 1 is saturated, lowers the energy density of light so that the elongation caused by the influence of heat can be ignored.

A fourth means of the present invention is a photostrictive device controller in which the control means 4 of the first to third means controls power consumption of the light source 2.

A fifth means of the present invention is a photostrictive device controller in which the control means 4 of the first to third means changes the energy density of light irradiated against the photostrictive device 1 by changing the position of a part of optical elements making up the illumination optics means 3.

A sixth means of the present invention is a photostrictive device controller in which the light source 2 of the first to fourth means produces pulsed light and in which the control means 4 changes the energy density of light irradiated against the photostrictive device 1 by changing the frequency, pulse width or intensity of the pulsed light.

A seventh means of the present invention is a photostrictive device controller in which the control means 4 of the first to third means changes the energy density of light irradiated against the photostrictive device 1 by inserting an ND filter 5 in the path of the illumination optics means 3.

An eighth means of the present invention is a photostrictive device controller in which the control means 4 of the first to seventh means has a measuring means 6 for measuring the temperature, induced voltage or induced current of the photostrictive device 1 and in which the control means 4 controls the energy denisty of light irradiated against the photostrictive device 1 according to an output of the measuring means.

A ninth means of the present invention is a photostrictive device controller in which the control means 4 of the first to seventh means has a second photostrictive device 7 close to the photostrictive device 1, measures the temperature, induced current and induced voltage of the second photostrictive device 7 and, according to the measured values, controls the energy density of light irradiated against the photostrictive device 1.

A tenth means of the present invention concerns a method of controlling a photostrictive device by irradiating light from the light source against the photostrictive device, which produces a photostrictive effect upon receiving light, to control the amount of strain of the photostrictive device, the controlling method comprising the steps of irradiating light of a predetermined energy density for a predetermined duration and, after the predetermined duration, lowering the energy density of light.

An eleventh means of the present invention is a photostrictive device controlling method of the tenth means in which, at a point close to where the photostrictive effect of the photostrictive device is saturated, the energy density of light irradiated against the device is lowered to such an extent that the elongation by the influence of heat can be ignored.

With this invention it is possible to enhance the response of the photostrictive device while suppressing temperature rise of the photostrictive device by changing with time the amount of energy supplied per unit time to the photostrictive device when driving it.

That is, with this invention, the light applied to the photostrictive device is set to a high energy density to enhance the response of the device until the device strain caused by the photostrictive effect is saturated and, after the device strain stops increasing, the light energy density is lowered to a level sufficient to keep the photostrictive device strained in a desired amount and at which the elongation caused by heat that the light irradiation imparts to the photostrictive device can be ignored.

As a result, the strain of the photostrictive device due to heat becomes minimum, making it possible to control the device with a fast response by the light applied to the photostrictive device and to suppress the temperature rise of the device caused by light irradiation.

With this invention, therefore, the control on the strain of the photostrictive device can be performed without being affected by the temperature rise of the photostrictive device.

DESCRIPTION OF THE PREFERRED EMBODIMENTS

Preferred embodiments of the photostrictive device controller according to this invention will be described by referring to the accompanying drawings.

[First Embodiment]

This embodiment corresponds to the first, second, third, fourth, tenth and eleventh means.

Figure 1:
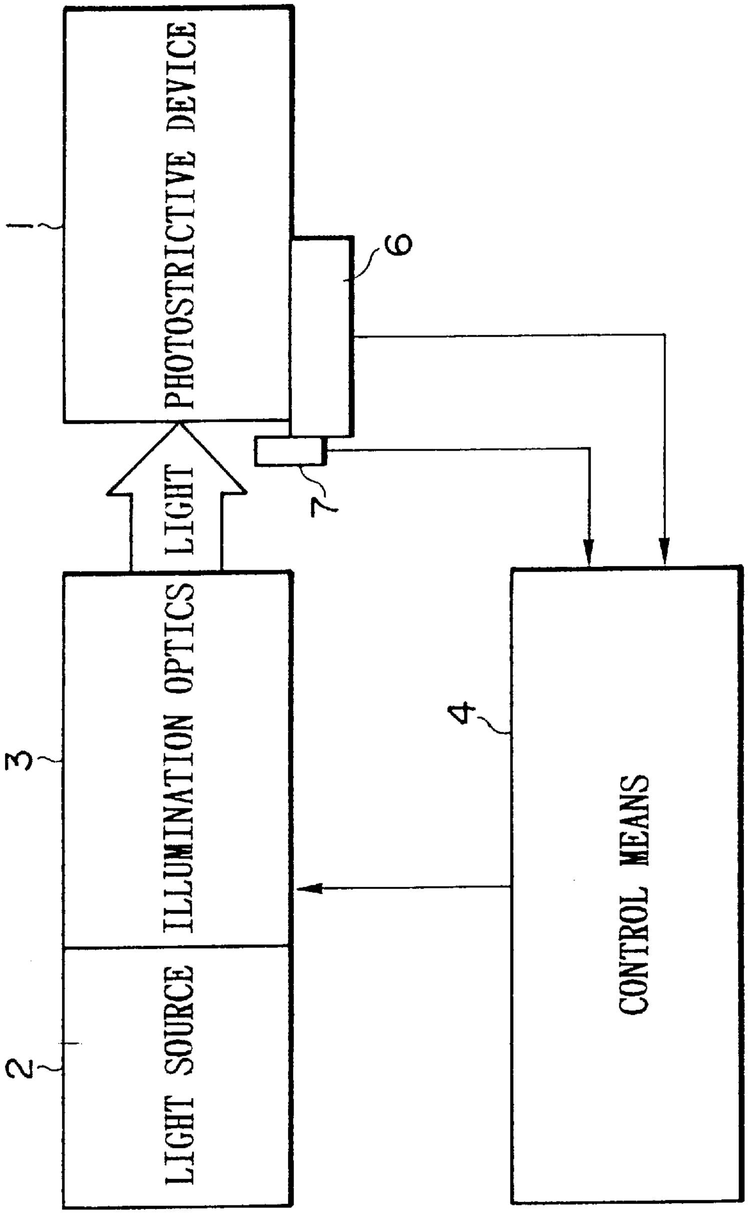
FIG. 1 is a schematic diagram showing the working principle of a photostrictive device controller of this invention and the configuration of first to third embodiments of the present invention.

The photostrictive device controller of this embodiment uses the above-mentioned PLZT for the photostrictive device that functions as an actuator, and, as shown in FIG. 1, includes a light source 2 for irradiating light against the photostrictive device 1, an illumination optics 3 for introducing light from the light source 2 to the photostrictive device 1, and a control means 4 for controlling the energy density of light projected to the photostrictive device 1.

The light source 2 may use a ultra-high voltage mercury lamp with the above-mentioned filters. Other light sources include, for example, ultraviolet lasers and other ultraviolet lasers (e.g., SGH) produced by wavelength conversion devices (crystals). It is also possible to use a light source in other wavelength ranges depending on the kind of the photostrictive device 1.

The illumination optics 3 comprises lenses and optical fibers and introduces light onto the photostrictive device 1.

The control means 4 performs control to project light of a predetermined energy density onto the photostrictive device 1 for a predetermined length of time and, after that predetermined length of time, to lower the light energy density.

That is, with this embodiment, when the photostrictive effect saturates, the control means 4 lowers the energy density of light irradiated against the photorestrictive device to a level at which the elongation caused by heat can be ignored.

The control means 4 of this embodiment changes the voltage of the electricity supplied to the light source 2 to adjust the power consumption and the light intensity of the light source.

When, for example, it is desired to elongate the photostrictive device by an elongation $\Delta\rho_0$ $\mu$m and maintain this elongation, light with an energy density level $Ed_1$ (relatively high energy density) is applied until the photostrictive effect is saturated and, after the saturation of the photostrictive effect is reached or the elongation is close to $\Delta\rho_0$ $\mu$m, the control means 4 lowers the light energy density to a level of $Ed_3$ (relatively low energy density). The reason that the light energy density is controlled in this way is that applying light of high energy density at an initial stage produces a better response and that because the overall light irradiation time is still short, no conspicuous temperature rise is observed and the elongation caused by heat is small. Another reason is that continuing to irradiate light of the energy density level $Ed_1$ after the photostrictive effect is saturated is useless, only causing a temperature rise and producing a retarded elongation from the heat influence. By lowering the light energy density to a level of $Ed_3$, it is therefore possible to suppress the temperature rise and thus the elongation due to heat and still maintain the elongation generated by the photostrictive effect from the light of energy density level $Ed_1$.

Figure 12:
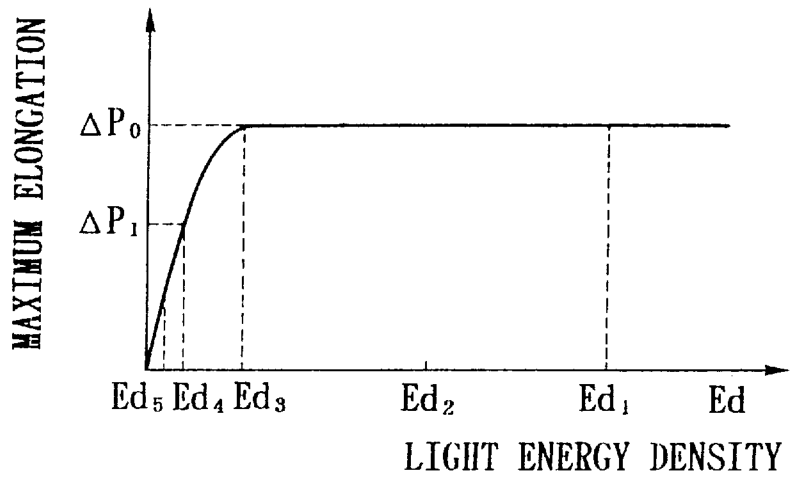
FIG. 12 is a graph showing the relation between the maximum elongation of the specimen caused by the photostrictive effect and the light energy density.
Figure 13:
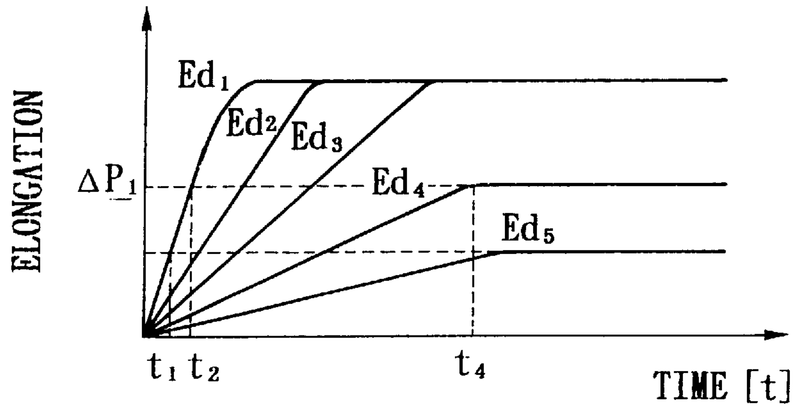
FIG. 13 is a graph showing the relation between the elongation of the specimen and the elapse of time.

When one wishes to elongate the photostrictive device by an elongation $\Delta\rho_1$ $\mu$m, one needs to continue irradiating the light of an energy density level $Ed_4$, as is seen from Graph 1 (FIG. 12). It is noted, however, that only continuing to apply the light of the level $Ed_4$ energy density will take a very long time $t_4$ before the elongation reaches $\Delta\rho_1$ $\mu$m, as shown in Graph 2 (FIG. 13). Hence, immediately after the start of irradiation, the high energy density level $Ed_1$ is used and at point $t_2$ when the elongation is close to elongation $\Delta\rho_1$, the energy density is switched to level $Ed_4$. This enables the desired elongation $\Delta\rho_1$ to be achieved quickly.

Second Embodiment

This embodiment corresponds to the first, second, third, fourth, eighth, tenth and eleventh means.

In this embodiment, the control means 4 has, as a temperature measuring means 6, a radiation thermometer that measures the temperature of the photostrictive device 1 without physical contact, or a thermister or thermocouple connected to the photostrictive device 1, and controls the energy density of light projected against the photostrictive device.

In this embodiment, upon detecting that the temperature of the photostrictive device 1 has risen to a predetermined temperature $t_1$, the control means 4 reduces the energy density of the light source 2 to a level that will keep the elongation of the photostrictive device 1 constant and the temperature of the device from increasing.

Then, while measuring the temperature of the photostrictive device 1, the control means 4 controls the light intensity of the light source 2 so that the temperature of the photostrictive device 1 will not increase.

Third Embodiment

This embodiment corresponds to the first, second, third, ninth, tenth and eleventh means.

In this embodiment, the control means 4 has a second photostrictive device 7 close to the first photostrictive device 1. By measuring the induced current and voltage in the second photostrictive device 7, the control means 4 controls the energy density of light projected to the photostrictive device 1 according to the measured values.

That is, this embodiment measures the induced current I and the induced voltage V of the second photostrictive device 7. When $I=I_0$ and $V=V_0$, for example, the photostrictive effect of the photostrictive device 1 is saturated and the control is performed so as to lower the energy density of light coming from the light source 2. Whether the photostrictive effect is saturated or not can also be determined by detecting the amount of change per unit time of the induced current and voltage $\Delta I$, $\Delta V$, respectively.

Fourth Embodiment

This embodiment corresponds to the first, second, third, fifth, tenth and eleventh means.

In this embodiment, the control means 4 changes the position of a part of the optical elements making up the illumination optics means 3 to change the energy density of light irradiated against the photostrictive device 1. The amount of light applied may be adjusted by presetting the irradiation time as in the first embodiment or by measuring the temperature, induced current and induced voltage as in the second or third embodiment.

Figure 2:
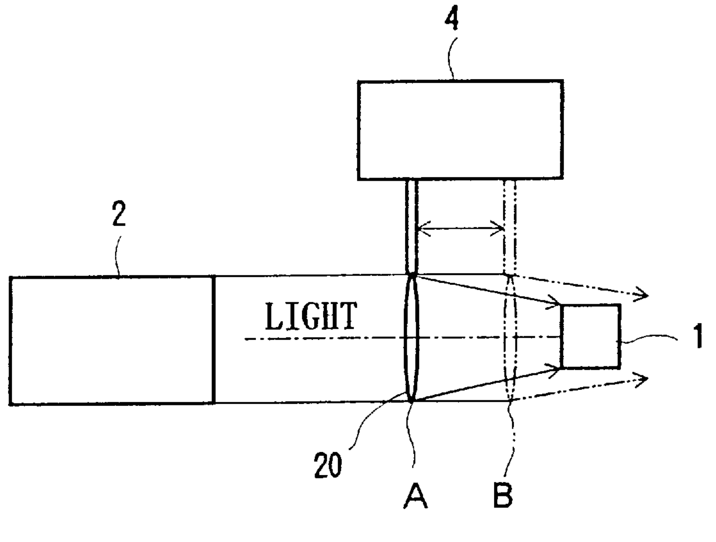
FIG. 2 is a schematic diagram showing the photostrictive device controller as a fourth embodiment of this invention.

In this embodiment, as shown in FIG. 2, a focusing lens (convex lens) 20, an optical element forming the illumination optics, is moved back and forth with respect to the photostrictive device 1 by a direct drive mechanism provided to the control means 4 to change the energy density of light projected to the photostrictive device.

That is, the focusing lens 20 is moved between a position A illustrated by a solid line where it projects almost the entire light from the light source 2 onto the photostrictive device 1 and a position B illustrated by an imaginary line, on the photostrictive device 1 side of the position A, where it irradiates a part of the light from the light source against the photostrictive device 1.

Fifth Embodiment

This embodiment corresponds to the first, second, third, sixth, tenth and eleventh means.

In this embodiment the light source 2 produces pulsed light for projection onto the photostrictive device 1.

The control means 4 changes the frequency, pulse width or intensity of the pulsed light to change the energy density of light applied to the photostrictive device 1.

Figure 3:
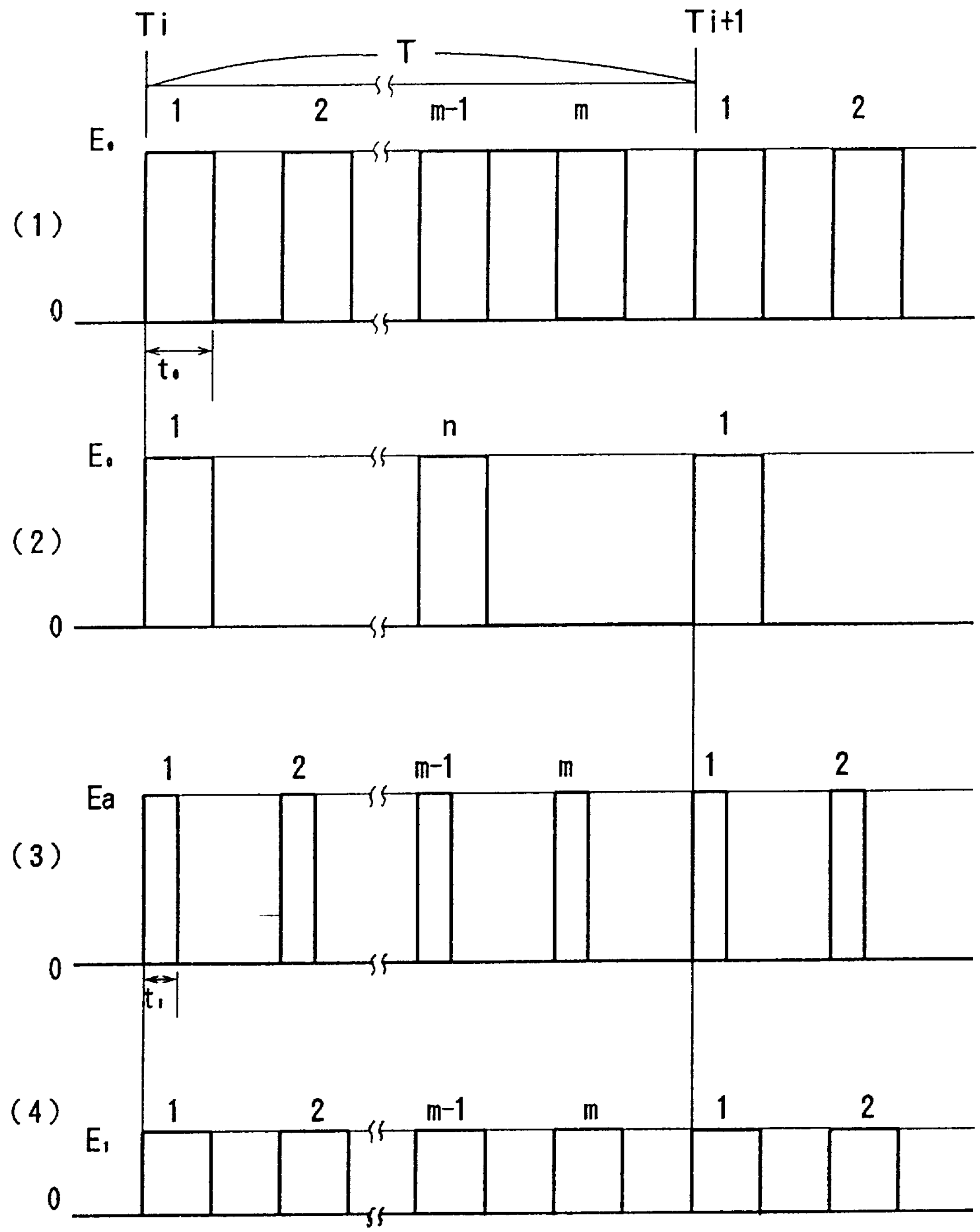
FIG. 3 is a graph showing the intensity of light in the photostrictive device controller as a fifth embodiment of this invention.

For example, consider a case where the light source 2 supplies an initial energy $E_0$ to the photostrictive device 1 n times during a period $t_0$ from time $T_i$ to time $T_{i+1}$, as shown in FIG. 3(1). The control means 4 may supply the energy $E_0$ m times (m<n) during the period $t_0$ from time Ti to time $T_{i+1}$, as shown in FIG. 3(2). That is, the frequency of the light pulse supplied is changed to alter the energy density of light pulse given to the photostrictive device.

This changes the light energy supplied to the photostrictive device to m/n of the initially supplied energy. The values $E_0$, T, m and n can be set as needed.

The energy density of light pulse applied to the photostrictive device can be adjusted by changing the pulse width from $t_0$ to $t_1$ ($t_0 > t_1$) as shown in FIG. 3(1) and (3) and the pulse intensity from $E_0$ to $E_1$ ($E_0 > E_1$) as shown in FIG. 3(1) and (4), or by combining these changes.

The quantity of light may be adjusted by presetting the light application time as with the case of the first embodiment or by measuring the temperature, induced current and induced voltage as with the case of the second and third embodiment.

Sixth Embodiment

This embodiment corresponds to the first, second, third, seventh, tenth and eleventh means.

Figure 4:
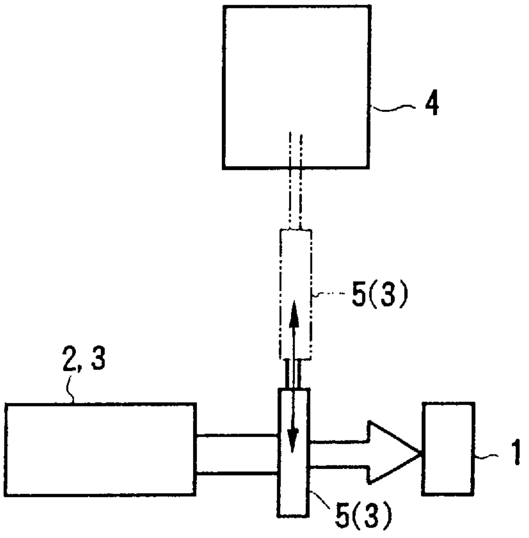
FIG. 4 is a schematic diagram showing the photostrictive device controller as a sixth embodiment of this invention.
Figure 5:
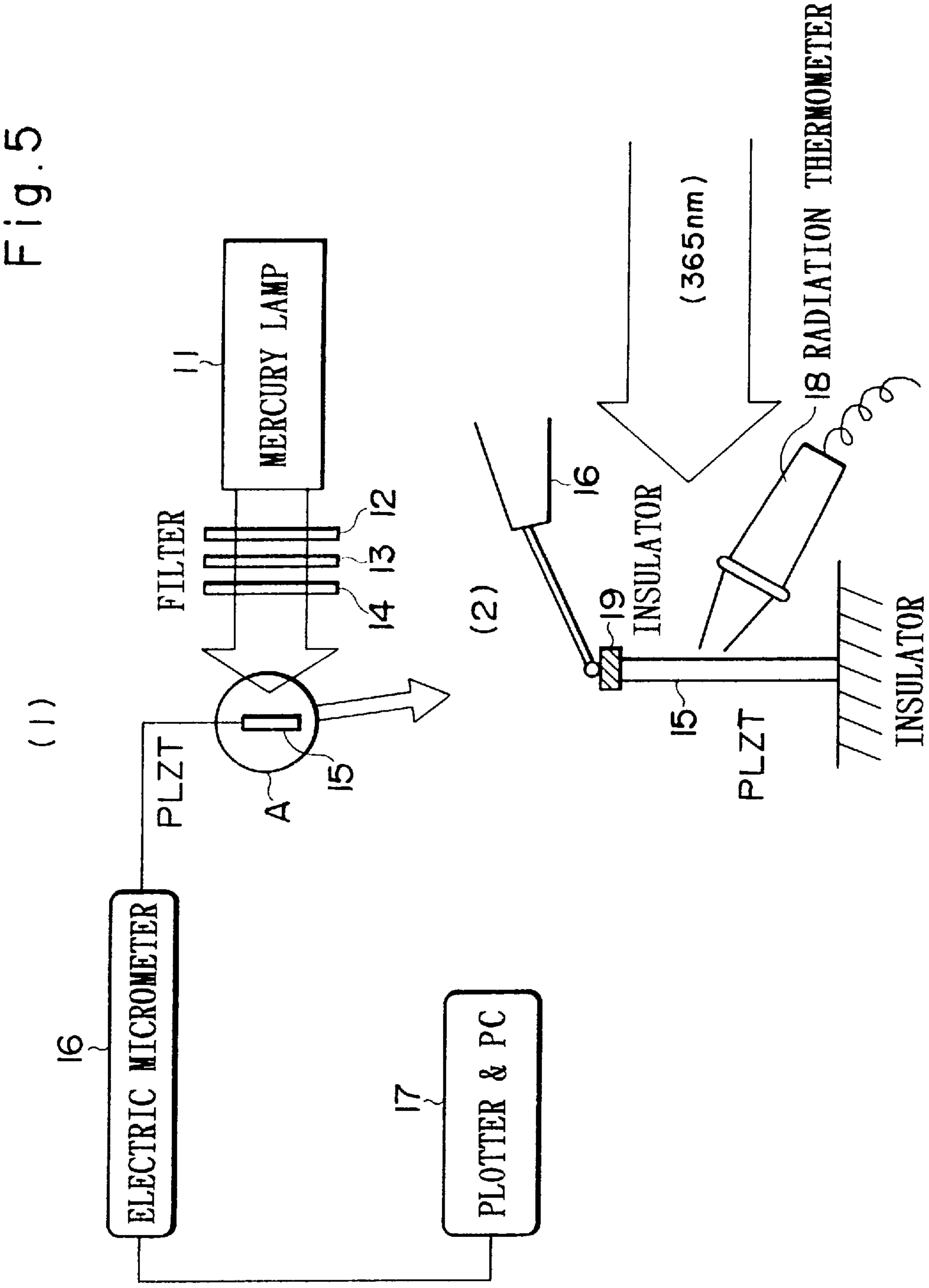
FIG. 5 is a schematic diagram showing the outline of the test equipment used to verify the photostrictive device controller and the photostrictive device control method of this invention, (1) representing an overall view of the test equipment and (2) representing an enlarged view of a part A in (1)
Figure 6:
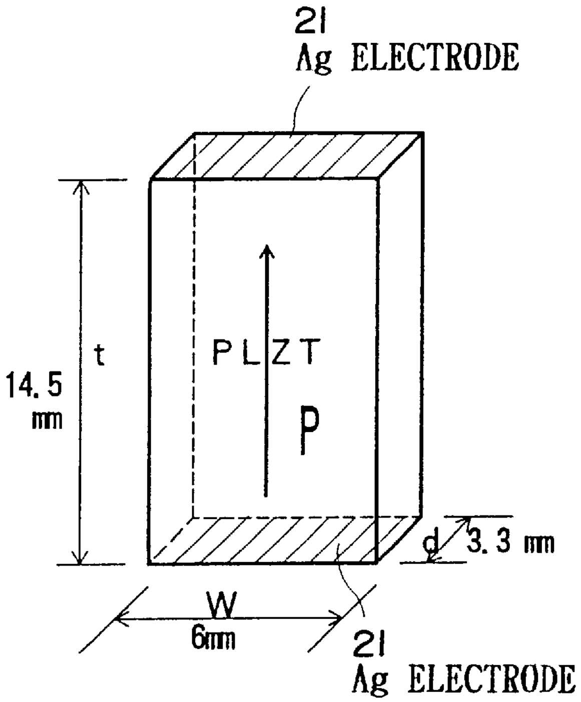
FIG. 6 is a perspective view of a sample used in the experiment shown in FIG. 5.
Figure 7:
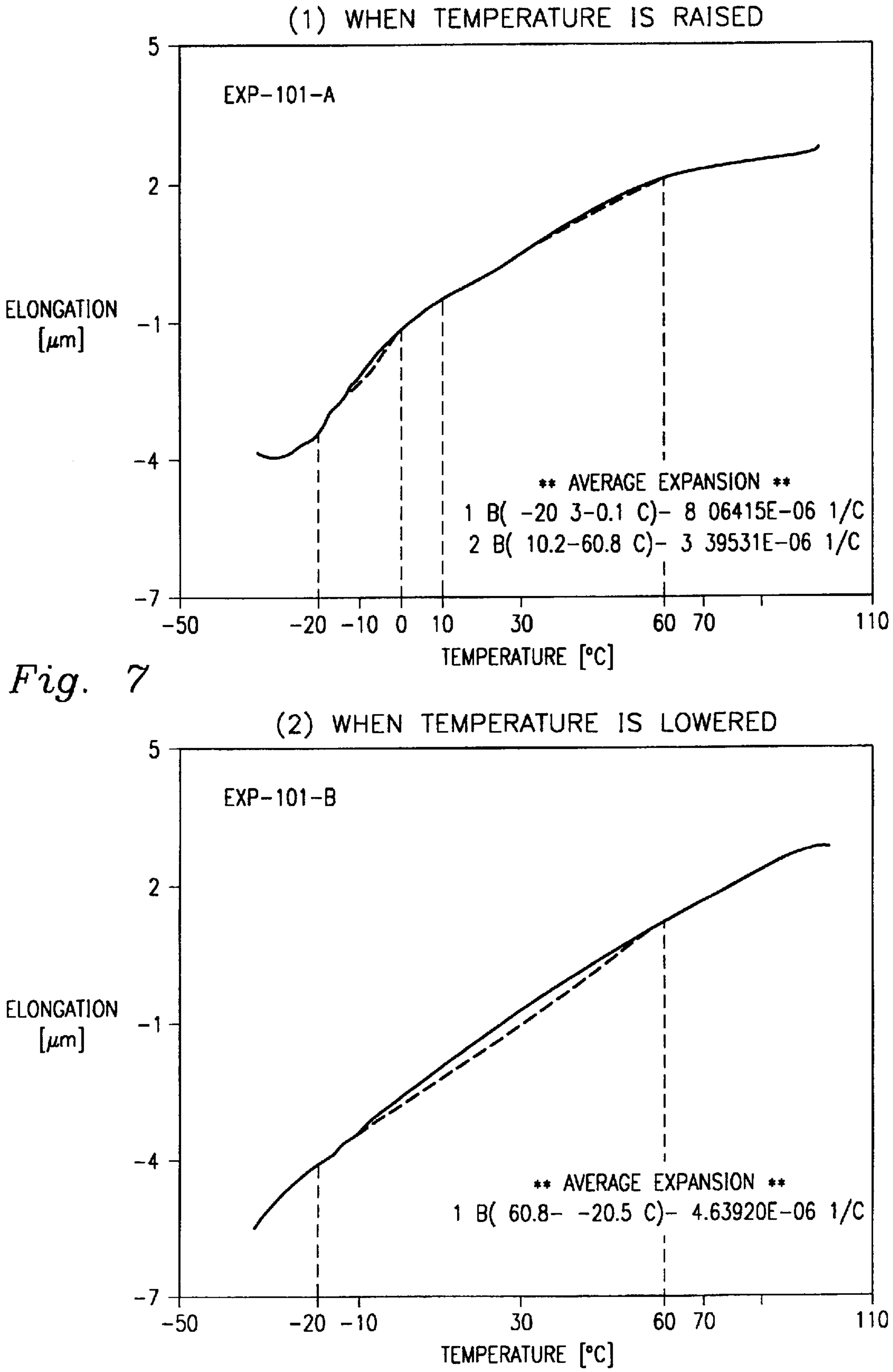
FIG. 7 is a graph showing measurements of elongation, (1) representing the relation between elongation and temperature of the sample when the temperature is being increased and (2) representing the same when the temperature is being lowered.
Figure 8:
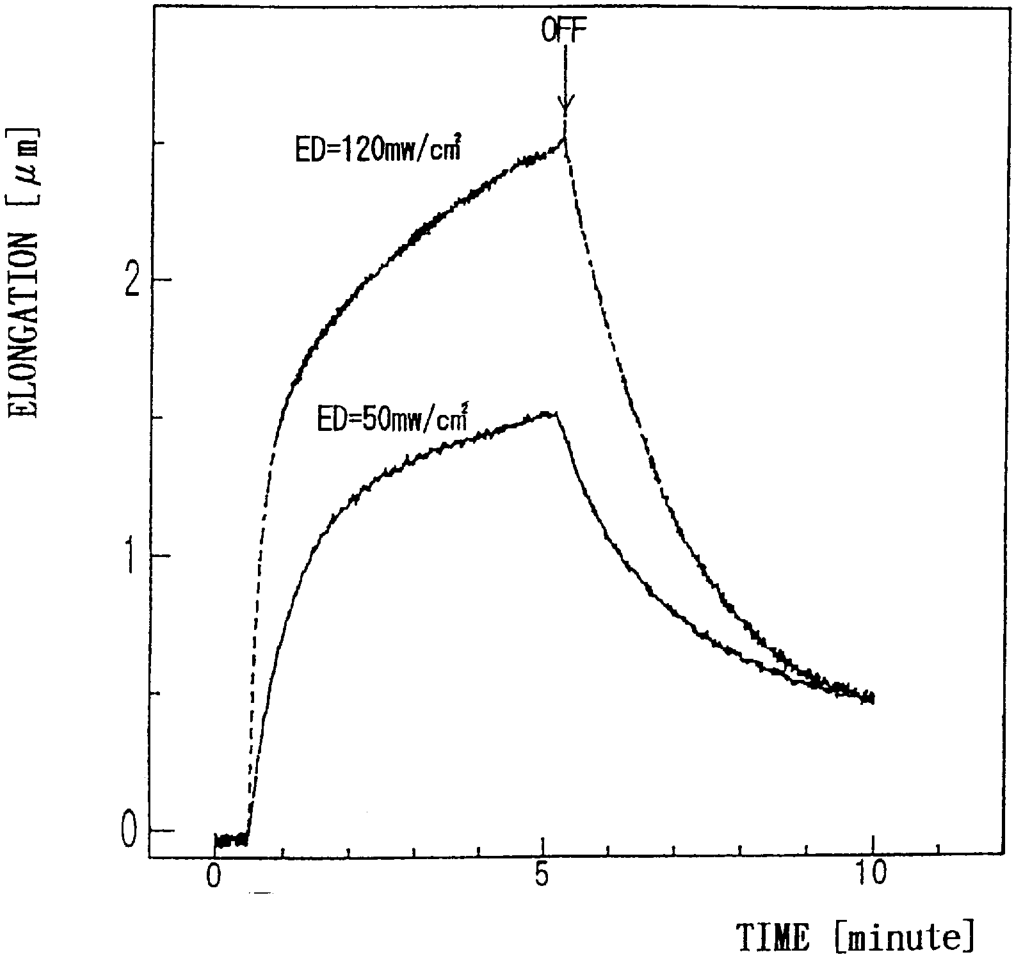
FIG. 8 is a graph showing the relation between the elapse of time and the elongation of the specimen irradiated with light in the experiment of FIG. 5.
Figure 9:
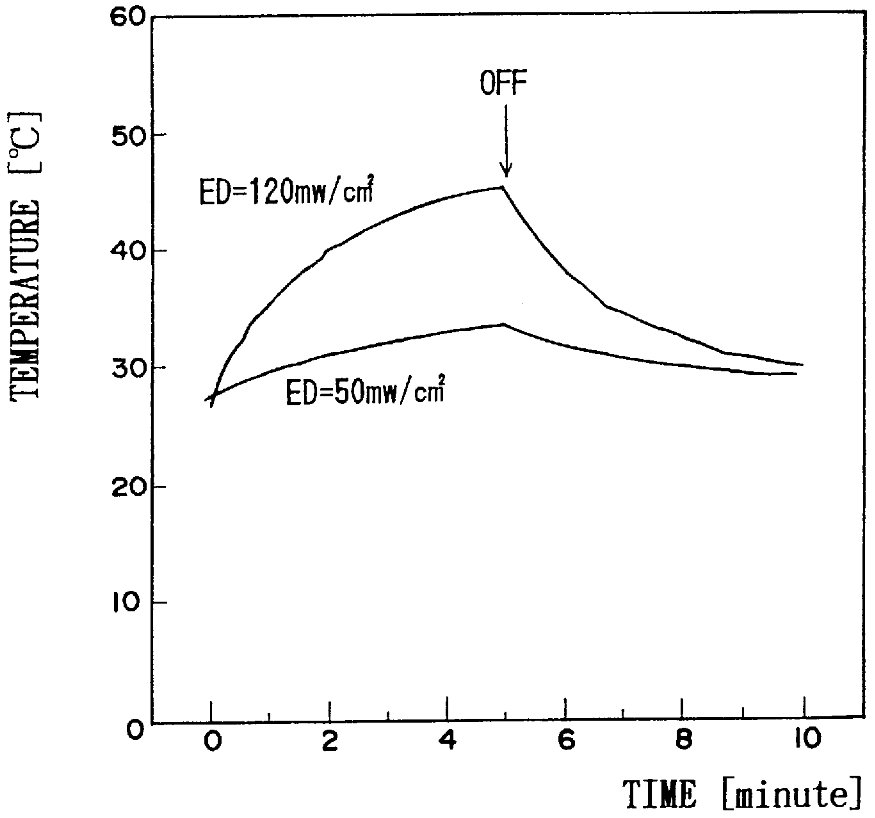
FIG. 9 is a graph showing the relation between the elapse of time and the temperature of the specimen irradiated with light in the experiment of FIG. 5.
Figure 10:
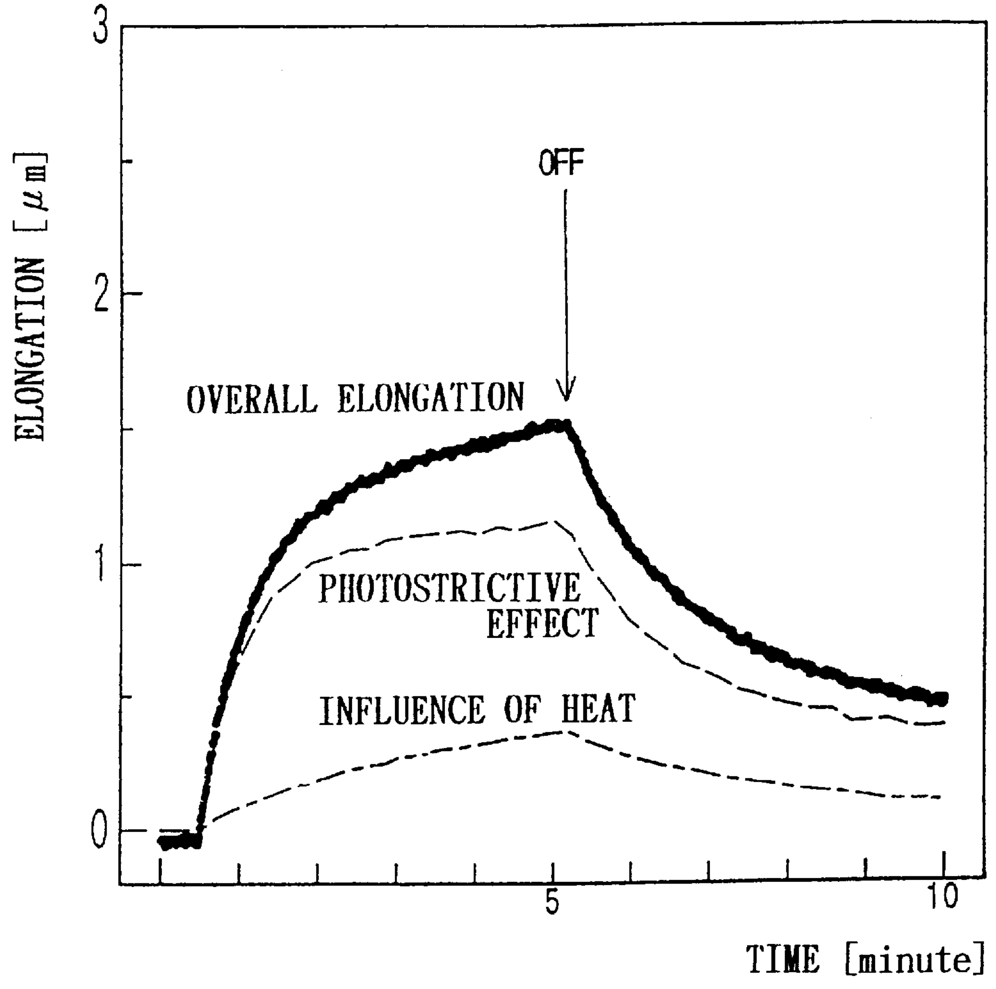
FIG. 10 is a graph showing changes over time of the overall elongation, the elongation caused by heat and the elongation caused by the photostrictive effect when the sample is irradiated with light of 50 $mW/cm^2$.
Figure 11:
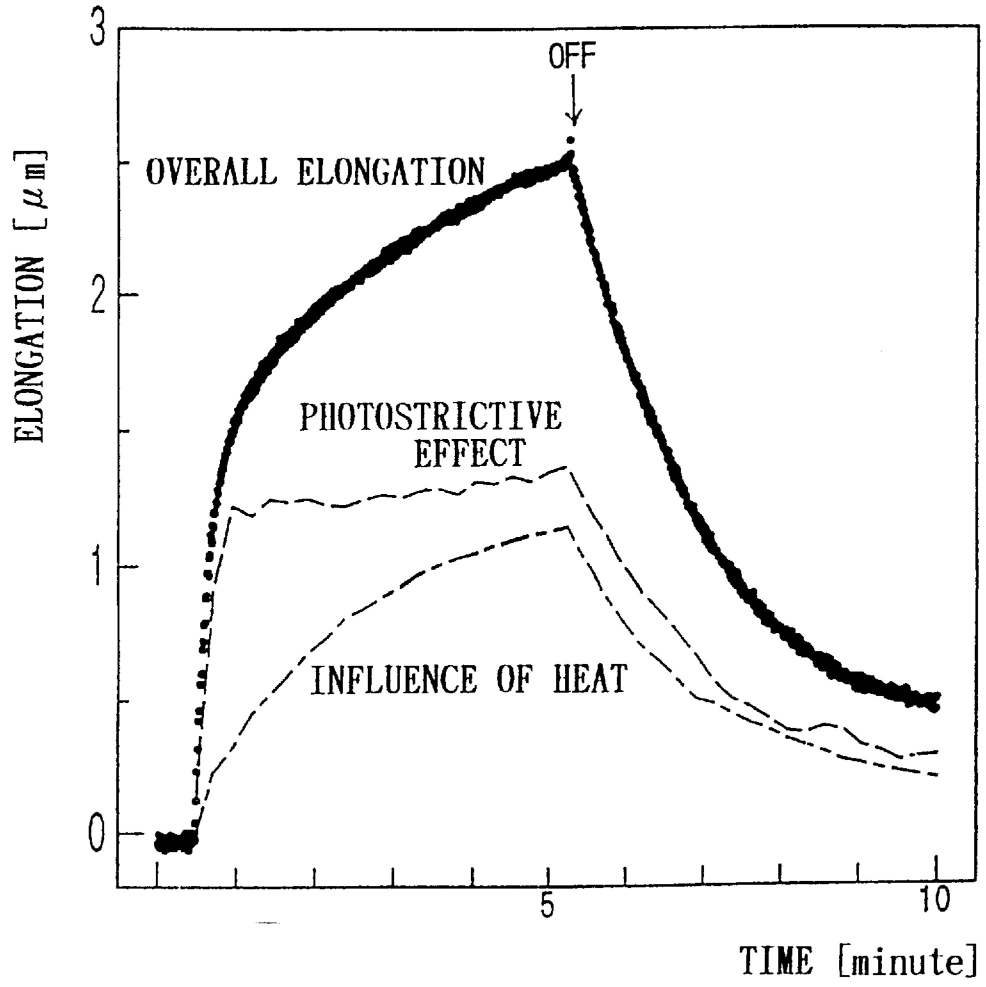
FIG. 11 is a graph showing changes over time of the overall elongation, the elongation caused by heat and the elongation caused by the photostrictive effect when the sample is irradiated with light of 120 $mW/cm^2$.

In this embodiment, the control means 4 changes the energy density of light irradiated to the photostrictive device 1 by inserting a neutral density (ND) filter 5 in a light path of the illumination optics means 3, as shown in FIG. 4, the ND filter 5 being adapted to reduce the energy density of incident light.

That is, in this embodiment, the ND filter attenuates the energy density of light to a predetermined level before projecting it to the photostrictive device 1.

The quantity of light may be adjusted by presetting the light application time as with the first embodiment or by measuring the temperature, induced current and induced voltage as with the second and third embodiment.

As described above, this invention sets the energy density of light projected to the photostrictive device to a level that will cause a large strain in the photostrictive device until the strain of the device caused by the photostrictive effect is saturated and, after the strain stops increasing, lowers the energy density to a level sufficient to maintain the strain of the photostrictive device already produced and at which the elongation caused by heat that the light irradiation imparts to the photostrictive device can be ignored. This minimizes the heat-induced strain of the photostrictive device, making it possible to control the photostrictive device with a fast response by irradiating light against the device and to suppress a temperature rise caused by light irradiation.

With this invention, because the control on the strain of the photostrictive device can be carried out without being affected by the temperature rise of the device, it is possible to perform the drive control on the photostrictive device in good condition when it is used as an actuator of micromachines.

What is claimed is:

1. A photostrictive device controller comprising:

a light source for irradiating light against a photostrictive device which produces a photostrictive effect upon receiving light;

an illumination optics for introducing light from the light source to the photostrictive device; and a control means for controlling the energy density of light introduced to the photostrictive device.

2. A photostrictive device controller according to claim 1, wherein the control means performs control so as to irradiate light of a predetermined energy density against the photostrictive device for a predetermined time and, after the predetermined time elapses, to lower the energy density of light.

3. A photostrictive device controller according to claim 1, wherein, at a point close to where the photostrictive effect of the photostrictive device is saturated, the control means lowers the energy density of the irradiated light to a level where the elongation caused by heat can be ignored.

4. A photostrictive device controller according to claim 1, wherein the control means controls power consumption of the light source.

5. A photostrictive device controller according to claim 1, wherein the control means changes the position of a part of optical elements of the illumination optics to change the energy density of the light projected to the photostrictive device.

6. A photostrictive device controller according to claim 1, wherein light source produces pulsed light and the control means changes the frequency, pulse width or intensity of the pulsed light to change the energy density of the pulsed light irradiated against the photostrictive device.

7. A photostrictive device controller according to claim 1, wherein the control means inserts an ND filter in a light path of the illumination optics to change the energy density of the light irradiated against the photostrictive device.

8. A photostrictive device controller according to claim 1, wherein the control means has a measuring means for measuring a temperature, induced voltage or induced current of the photostrictive device and, based on an output from the measuring device, controls the energy density of the light irradiated against the photostrictive device.

9. A photostrictive device controller according to claim 1, wherein the control means has a second photostrictive device close to the first photostrictive device, measures a temperature, induced voltage or induced voltage of the second photostrictive device, and, based on the measured values, controls the energy density of the light irradiated against the first photostrictive device.

10. In a photostrictive device control method, which irradiates light from a light source against a photostrictive device, that produces a photostrictive effect upon receiving light, to control an amount of strain of the photostrictive device, the photostrictive device control method comprising the steps of:

irradiating light of a predetermined energy density for a predetermined duration of time; and after the elapse of the predetermined duration, lowering the energy density of the irradiated light.

11. The photostrictive device control method according to claim 10, wherein, at a point close to where the photostrictive effect of the photostrictive device is saturated, the energy density of the irradiated light is lowered to a level at which the elongation caused by heat can be ignored.

* * * * *

UNITED STATES PATENT AND TRADEMARK OFFICE

CERTIFICATE OF CORRECTION

PATENT NO. : 5,774,259

DATED : June 30, 1998

INVENTOR(s) : Susumu Saitoh et al.

It is certified that error appears in the above-identified patent and that said Letters Patent is hereby corrected as shown below:

Col. 2, line 43, “26-60” should be --20·0--

Signed and Sealed this

Tenth Day of November 1998

*Attest:*

BRUCE LEHMAN

*Attesting Officer*

*Commissioner of Patents and Trademarks*